Dec. 27, 1960     F. M. GILLETT ET AL     2,965,952
METHOD FOR MANUFACTURING ETCHED CIRCUITRY
Filed July 18, 1955     4 Sheets-Sheet 1

FREDRIC M. GILLETT,
ARTHUR A. KATZ,
INVENTORS

BY Henry Heyman

ATTORNEY

Dec. 27, 1960  F. M. GILLETT ET AL  2,965,952
METHOD FOR MANUFACTURING ETCHED CIRCUITRY
Filed July 18, 1955  4 Sheets-Sheet 2

FREDRIC M. GILLETT,
ARTHUR A. KATZ,
INVENTORS

BY Henry Heyman
ATTORNEY

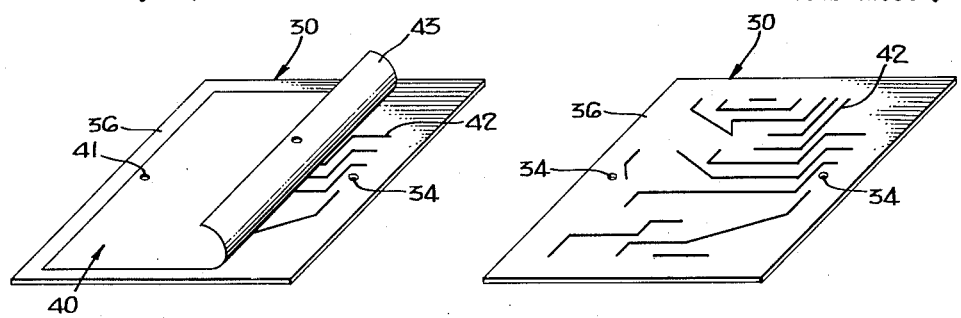
*FIG.12.*  *FIG.13.*
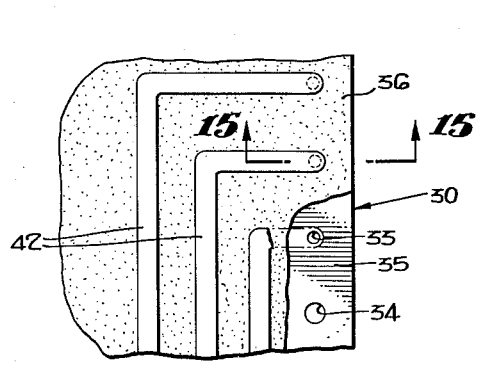
*FIG.14.*
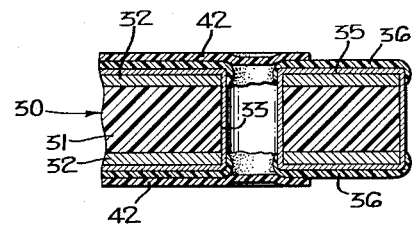
*FIG.15.*
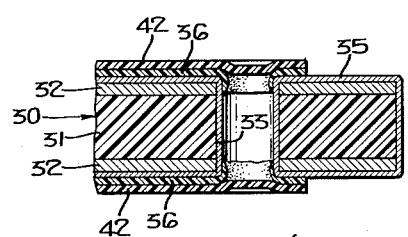
*FIG.16.*
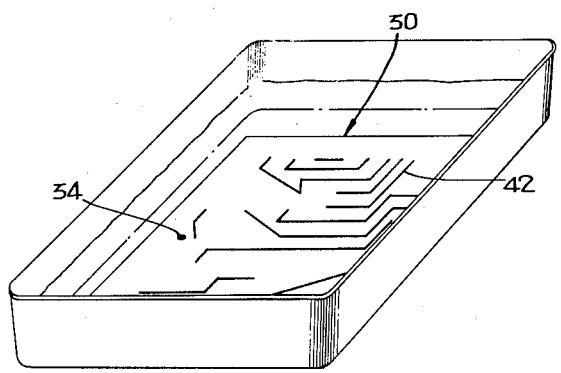
*FIG.17.*
FREDRIC M. GILLETT,
ARTHUR A. KATZ,
INVENTORS
BY Henry Heyman
ATTORNEY Dec. 27, 1960   F. M. GILLETT ET AL   2,965,952
METHOD FOR MANUFACTURING ETCHED CIRCUITRY
Filed July 18, 1955   4 Sheets-Sheet 4

FREDRIC M. GILLETT,
ARTHUR A. KATZ,
INVENTORS

BY Henry Heyman
ATTORNEY

United States Patent Office 2,965,952
Patented Dec. 27, 1960

2,965,952

METHOD FOR MANUFACTURING ETCHED CIRCUITRY

Fredric M. Gillett and Arthur A. Katz, Los Angeles, Calif., assignors, by mesne assignments, to the United States of America as represented by the Secretary of the Air Force Filed July 18, 1955, Ser. No. 522,529

2 Claims. (Cl. 29—155.55)

The present invention relates generally to a method for manufacturing etched electrical circuits, and relates more particularly to such a method including the use of decalcomanias therein.

Etched electrical circuitry has long been employed as a means for efficiently interconnecting electrical or electronic components in a rapid manner, in small space envelopes and with as little weight as possible. This circuitry generally takes the form of sheets of dielectric material on which strips of a conductive material extend, a plurality of holes in this material, interconnected by these strips, serving to provide attachment means for the connected components.

Heretofore, the manufacture of etched electrical circuitry has been carried out by, first punching a plurality of holes through a copper clad sheet of phenolic resin. Inasmuch as the sheets are generally provided with circuits on each side thereof, it is desirable and often necessary that the holes therein be coated or plated with a conductive material in order to enable electrical connection between the two circuit patterns. This connection is generally accomplished by first sensitizing the punched sheet and the surface of the phenolic material in the holes with a suitable material, spraying mirror silver thereon, sanding excess silver from the surface of the sheet and plating the overall sheet including the surfaces of the holes with a conductive material such as copper. Thereafter, the holes were filled with an inert material, such as a protein substance, and the entire sheet was coated with a light sensitive cold top enamel. The plates thus coated were thereafter exposed to a strong light source, through a suitable negative, thus photographically to imprint desired circuit patterns on the plate, with the patterns thus provided being developed and cleared through a suitable photographic process leaving the cold top enamel in areas where such circuit patterns were desired, these circuit patterns interconnecting the punched, plated and filled holes existing in the plate. The plates thus prepared were placed in an acid etching bath, whereby to remove the plating and the copper clad surface from the phenolic base material, leaving such plating and copper clad in the areas beneath the exposed portions of the cold top enamel. The enamel was thereafter washed from the plates and the filling material removed from the holes in the plate, whereby to complete the finished plate having the desired circuit pattern provided thereon by means of a plurality of conductive copper strips of material.

In some instances, it may be desirable to eliminate the beforementioned plating of the annular surfaces of the holes in the plate, incorporate relatively thick conductive material and utilize eyelets or the like through the holes to interconnect circuits on each side of the plate. When using eyelets, it is customary to solder the eyelet to the conductive strips.

The process described hereinbefore has naturally been rather slow, not in keeping with present mass production techniques and therefore necessarily costly. Additionally, the applying and exposing of the cold top enamel requires expensive photographic apparatus and considerable time, while the filling and later cleansing of the plated holes was also very time consuming, as it was necessary to first fill the holes with the desired inert material and then to surface the plate in order that the filling material would reside only in the holes and not on the surfaces of the plate.

It is, accordingly, one object of the present invention to provide a novel method of manufacturing etched circuitry.

It is another important object of the present invention to provide a novel method for manufacturing etched circuitry, said method employing decalcomanias as a resist to the action of etching solutions.

It is a further important object of the present invention to provide a novel means for securing a decalcomania to a surface of a copper clad sheet as one step in a novel process for manufacturing etched circuitry.

Still another important object of the present invention is to provide a novel decalcomania for use in a method for producing etched circuitry, wherein a bonding adhesive for such decalcomania is included as a portion thereof and extended over selected portions of a pattern contained thereon.

Other and further important objects of the present invention will become apparent from the disclosures in the following detailed specification, appended claims and accompanying drawings, wherein:

Figs. 10, 11, 12 and 13 are isometric views showing further steps in the present process;

Fig. 14 is an enlarged fragmentary plan view, with areas broken away, of a portion of the sheet following application of the decalcomania thereto;

Fig. 15 is an enlarged fragmentary sectional view taken substantially as indicated by line 15—15, Fig. 14 and showing the disposition of the decalcomania with respect to the holes in the sheet;

Fig. 16 is a sectional view similar to Fig. 15 showing the sheet and applied decalcomania following removal of excess adhesive therefrom;

Fig. 17 is an isometric view showing the etching step of the present process;

Figure 1:
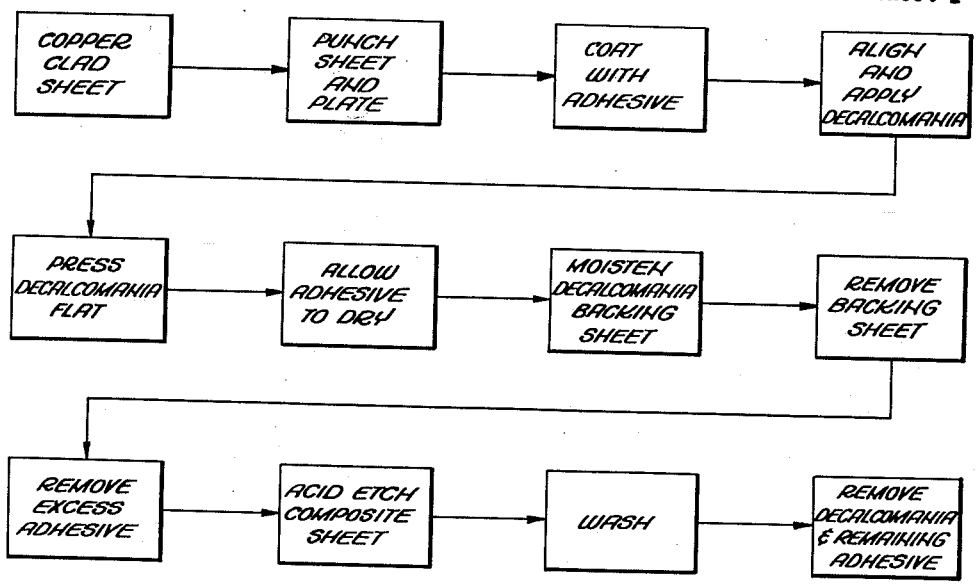
Figure 1 is a schematic chart showing the various steps of the present process.
Figure 2:
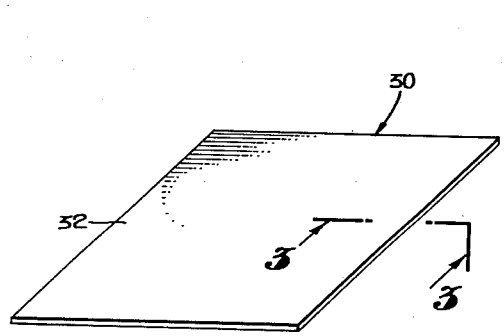
Fig. 2 is an isometric view showing an original sheet of copper clad material.
Figure 3:
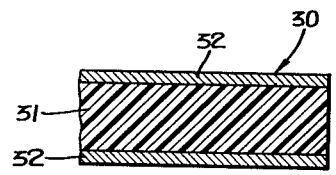
Fig. 3 is an enlarged fragmentary sectional view of the copper clad material, as taken substantially as indicated by line 3—3, Fig. 2.
Figure 5:
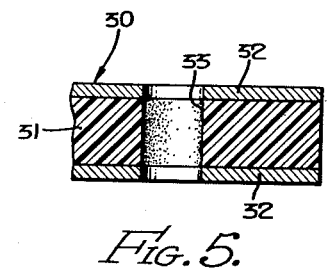
Fig. 5 is an enlarged fragmentary sectional view taken substantially as indicated by line 5—5, Fig. 4 and showing one of the several holes in the sheet.
Figure 4:
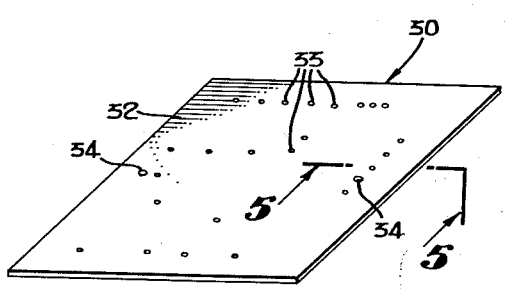
Fig. 4 is an isometric view showing the sheet of Fig. 2 after having been punched with a plurality of holes in a suitable pattern.
Figure 6:
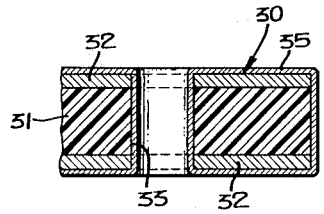
Fig. 6 is a view similar to Fig. 5 showing the appearance of the sheet and holes after having been suitably plated.

With reference to the drawing, wherein like reference characters denote like parts or steps in the present process throughout several views, Fig. 1 may be utilized as an overall reference while the various other Figs. 2 through 19 inclusive disclose particular details of the process. As shown in Figs. 2 and 3, a sheet of copper clad material, indicated generally at 30, comprises a centrally disposed phenolic resin core 31 having sheets of copper or other suitable conductive material 32 applied thereto in the form of a coating and in any suitable manner. These particular sheets of material are generally available and commercially used and form no individual part of the present invention. In the drawings, the various thicknesses of the materials and layers thereon have been exaggerated for clarity with the actual conductive material 32 being relatively thin and in the nature of .005" to .010" in thickness.

The sheet 30 is thereafter punched with a suitable pattern of holes 33 with the particular location of these holes being determined by requirements of the particular circuit desired. For such punching, it is the general practice to employ a multiple die for the purpose. Additionally, the plate 30 may be simultaneously punched with a pair of aligning holes 34, the purpose of which will be later described.

As stated hereinbefore, in order that good electrical conduction may be maintained as between printed circuits on each side of the plate 30, it is desirable that the holes 33 have a conductive coating applied along the surfaces thereof and interconnecting the conductive copper sheets 32. This coating is generally applied as by plating the entire sheet with either copper or silver or both, these materials or other substances with the method of applying this plating also forming no particular detailed part of the present invention. The plated sheets are shown in fragmentary section in Fig. 6 with the plating being indicated at 35. Thus, the copper 32 on each side of the sheets are electrically interconnected by means of the plating extending through the holes 33.

Figure 7:
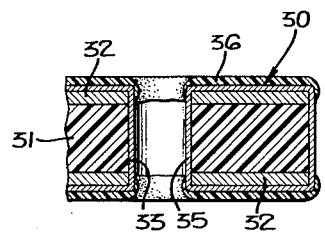
Fig. 7 is a view, also similar to Figs. 5 and 6, showing the plated material with a coating of adhesive thereon.
Figure 8:
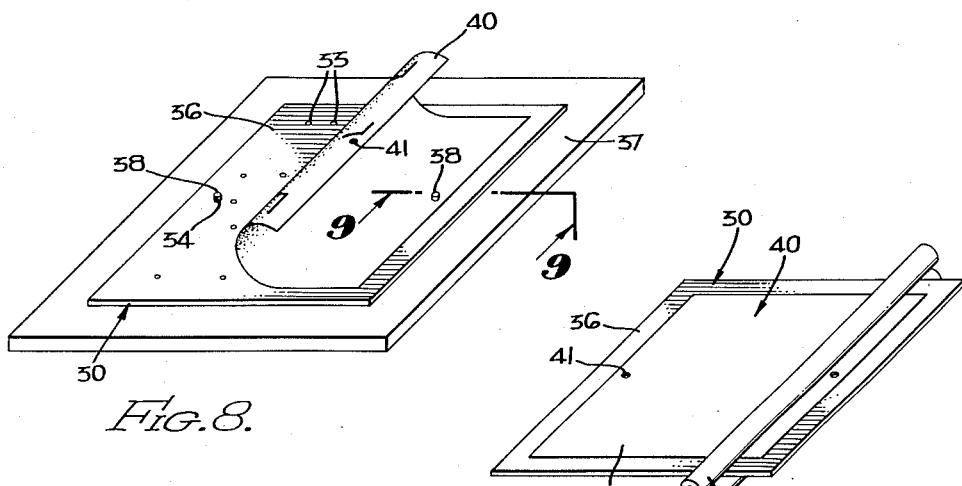
Fig. 8 is an isometric view showing a means for applying and aligning a decalcomania with respect to the punched, plated and coated sheet.

In accordance with further steps in the present process, the plated sheet, as shown in Fig. 7, is next coated over the entire surface thereof with a liquid adhesive material indicated at 36 and which may be in the form of a varnish or the like that is relatively quick drying. The plate 30 is thereafter placed upon a suitable surface 37 from which a pair of alignment pins 38 extend, with the alignment pins being disposed through the alignment openings 34 in the plate, and a decalcomania, indicated generally at 40 and having alignment openings 41, may be placed upon and aligned with the plate 30. The decalcomania 40 may be of any suitable type such as either a simplex or a duplex type thereof and includes a pattern of a plurality of strips 42 of enamel or the like and a backing sheet 43. The backing sheet 43 may comprise a plural number of individual sheets or tissue material in order to support the individual unconnected strips of enamel material 42 patterned in the desired configuration for the finished circuitry.

Figure 10:
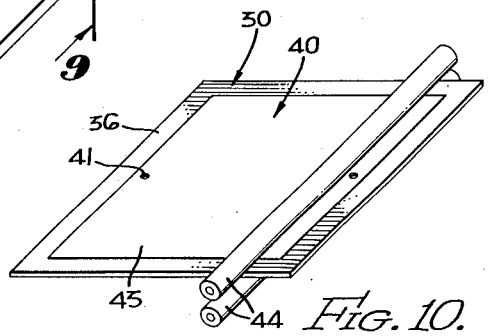
Figure 9:
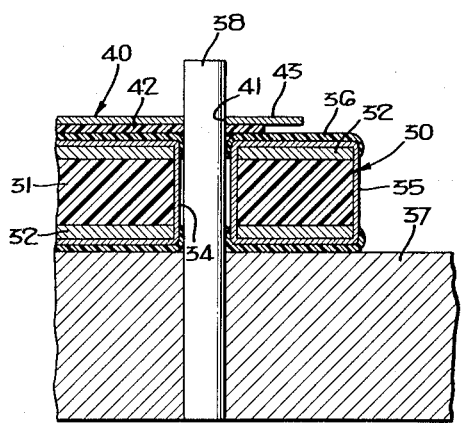
Fig. 9 is an enlarged fragmentary sectional view taken substantially as indicated by line 9—9, Fig. 8 and showing details of the decalcomania alignment means.
Figure 11:
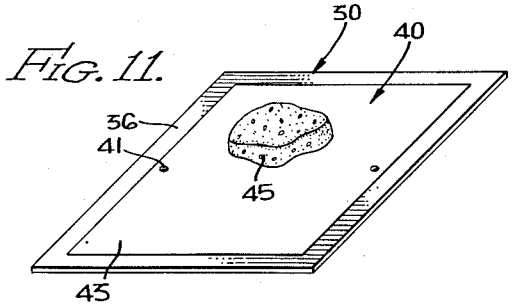

As shown in Fig. 9, the alignment pins 38 serve to dispose the decalcomanic pattern in the desired location on the sheets 30 with the adhesive 36 serving to bond the pattern to the plated sheet 30. Thereafter, as shown in Fig. 10, the decalcomanias, which may be applied to both sides of the sheet 30, may have pressure applied thereto by means of pressing or by passage between suitable pressure rollers 44 in order firmly to secure the decalcomania to the plated and coated sheet 30. In the usual manner with respect to decalcomanias of this type, the backing sheet 43 thereof may thereafter be moistened, through use of a sponge or the like as indicated at 45 and, as shown in Fig. 12, the backing sheet 43 may then be removed, leaving the decalcomanic pattern defined by the enamel strips 42 on the surface of the plate 30 in the manner shown in Fig. 13.

As shown in the enlarged fragmentary view of Fig. 14, the strips 42 are adapted to extend over the holes 33, whereby to cover these holes and prevent the later intrusion of the etching solution therein, with the strips 42 acting as a resist to the action of such acid. The particular configuration of the sheet 30, together with the decalcomanias applied thereto, is shown in detail in Fig. 15, with the strips 42 covering and being slightly depressed in the open ends of the plated holes 33.

Following application of the decalcomania to the plated and coated sheet 30, as shown in Figs. 13, 14 and 15, the excess adhesive 36, without the pattern defined by the enamel decalcomanic strips 42, may thereafter be removed as by any suitable solvent material, thus leaving such adhesive in the perpendicular areas only between the strips 42 and the surface of the plating 35 on the sheet 30 and exposing the metallic surfaces of the sheet 30 in the planar areas between the strips 42. This condition is shown in Fig. 16.

Figure 18:
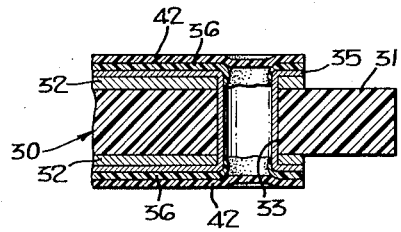
Figs. 18 and 19 are views similar to Figs. 15 and 16 showing first the appearance of the present sheet and decalcomania following etching thereof and, thereafter, the appearance of the sheet following removal of the decalcomania and remaining adhesive.

As shown in Fig. 17, the entire plate thus prepared in the manner of Fig. 16 may thereafter be immersed in or otherwise treated with a suitable etching solution, such as an acid or the like, which will combine with and remove the exposed metallic material carried by the phenolic core 31 and not covered by the strips 42 or enamel 36. Following the etching step in the process, the etched sheet may then be washed to remove any remaining etching solution and will appear as shown in Fig. 18 with the phenolic core 31 being bared by action of the solution upon the metallic coatings thereon. It is to be noted that the portions of the decalcomania overlying the holes 33 serve to cover these holes and to prevent intrusion of etching solution therein.

Figure 19:
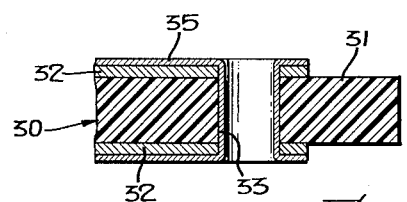

Again, through use of any suitable solvent material, the decalcomanic strips 42, together with the remaining adhesive 36, may thereafter be removed from the sheet 30, as shown in Fig. 19, thus to leave the etched pattern upon the phenolic core or base 31 in the manner desired and, furthermore, to insure retention of the plating 35 extending through the holes 33 and electrical connection between the copper coating 32 on each side of the sheets, this coating now being in the form of strips equal to those like strips on the decalcomania and forming the desired circuit pattern.

Thus, considerably less effort is expended in the preparing of an etching solution resistive coating over a portion of the sheet 30 and the covering or blocking of the holes 33, in order to prevent intrusion of etching solution therein, than was heretofore accomplished in accordance with prior processes wherein the holes 30 were necessarily filled with an inert material, thus requiring these holes to be thereafter cleaned, with considerable effort being necessary for such cleaning operation. It is comparatively easy, through use of suitable solvents, to remove not only the excess adhesive 36 from the sheet but also, thereafter and following etching, to remove the decalcomania and remaining adhesive.

Figure 20:
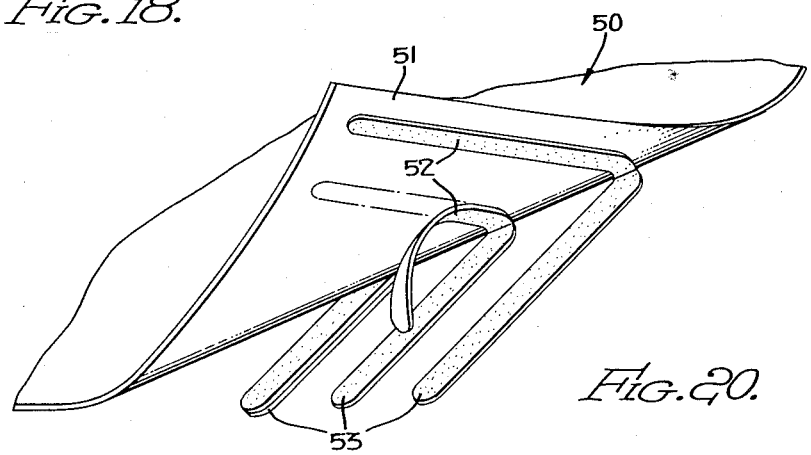
Fig. 20 is a fragmentary perspective view showing an alternative type of decalcomania which may be utilized with the present process.
Figure 21:
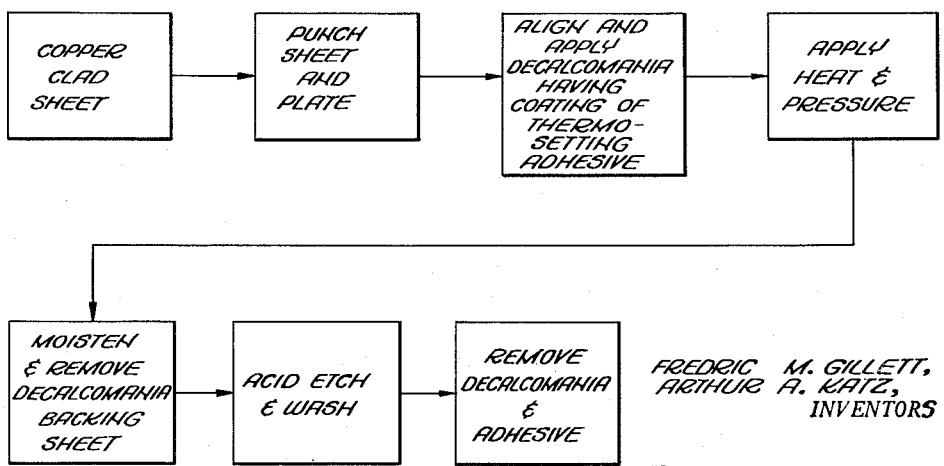
Fig. 21 is a schematic flow chart showing a method of manufacturing etched circuitry utilizing the alternative decalcomania of Fig. 20.

As shown in Fig. 20, a decalcomania indicated generally at 50 may be provided with a backing sheet 51 and suitable enamel strips 52 forming the pattern on the decalcomania. A coating of adhesive 53, which may be of the thermosetting variety, may then be applied as by a silk screen process to the strips 52 in a manner similar to the application of the enamel strip 52 to the backing sheet 51, and only over the areas of the strips 52. Thus, as shown in the chart of Fig. 21, a portion of the present process may be eliminated or the number of steps considerably reduced, particularly as applied to the removing of excess adhesive prior to the plating operation. In other words, a punched and plated sheet is usual and has the decalcomania of Fig. 20 aligned and applied thereto, suitable heat and pressure is next exerted upon the decalcomania to force adhesion thereof to the sheet 30 with the decalcomania being thereafter merely moistened, the backing sheet removed, the plate etched and washed and thereafter the decalcomania, together with the adhesive being removed from the plate, thus to create a pattern configuration similar to the type disclosed in Fig. 19.

It may thus be seen that, through use of the processes of the present invention, considerable time and effort may be saved, together with reduced cost being obtained, in connection with the manufacture of etched electrical circuitry, while the quality of such circuitry is maintained at a high level, the present process being suitable for integration with other mass production techniques.

Having thus described the invention and the present embodiments thereof, it is desired to emphasize the fact that many further modifications may be resorted to in a manner limited only by a just interpretation of the following claims.

What is claimed is:

1. A method of manufacturing etched circuitry comprising, in combination, the steps of: punching a plurality of holes through a sheet of dielectric material having relatively thin sheets of conductive material secured to each side thereof; plating said sheet and annular surfaces of said holes with a conductive material; coating said plated sheet with an adhesive; covering said holes with a portion of the pattern carried by a decalcomania, whereby said decalcomania overlies said sheet in an aligned manner, securing said decalcomania in tight contact with said adhesive; moistening and removing a backing sheet from said decalcomania; removing excess adhesive from areas of said plated sheet not covered by said decalcomanic pattern; exposing said sheet together with said decalcomania to an acid etching solution, said pattern serving as a resist to the effect of such etching solution, said etching solution serving to displace portions of said metallic sheets in areas not covered by said decalcomanic pattern; and removing said decalcomanic pattern together with adhesive residing between said pattern and said plated surface of said sheet, whereby to leave an etched pattern of relatively narrow strips of conductive material on the surface of said dielectric material.

2. A method of manufacturing etched circuitry comprising, in combination, the steps of: punching a plurality of holes through a sheet of dielectric material having relatively thin sheets of conductive material secured to each side thereof; plating said sheet and annular surfaces of said holes with a conductive material, whereby to establish electrical connection between said sheets of conductive material; coating said plated sheet with an adhesive; covering said holes with a portion of the pattern carried by a decalcomania, whereby said decalcomania overlies said sheet in an aligned manner; pressing said decalcomania into tight contact with said adhesive; drying said adhesive; moistening and removing a backing sheet from said decalcomania; removing excess adhesive from areas of said plated sheet not covered by said decalcomanic pattern; exposing said sheet together with said decalcomania to an acid etching solution, said pattern serving as a resist to the effect of such etching solution, said etching solution serving to displace portions of said metallic sheets in areas not covered by said decalcomanic pattern, whereby said decalcomanic pattern also prevents the intrusion of etching solution into said holes; and removing said decalcomanic pattern together with adhesive residing between said pattern and said plated surface of said sheet, whereby to leave an etched pattern of relatively narrow strips of conductive material on the surface of said dielectric material.

References Cited in the file of this patent

UNITED STATES PATENTS

| | | |
|---|---|---|
| 753,097 | Palm et al. | Feb. 23, 1904 |
| 1,515,676 | Grupe | Nov. 18, 1924 |
| 2,641,562 | Chartrand et al. | June 9, 1953 |
| 2,699,424 | Nieter | Jan. 11, 1955 |
| 2,716,268 | Steigerwalt | Aug. 30, 1955 |
| 2,734,150 | Beck | Feb. 7, 1956 |
| 2,777,192 | Albright et al. | Jan. 15, 1957 |

OTHER REFERENCES

Modern Plastics, "How Etched Circuits Are Made," Robert L. Swigett, April 1954, vol. 31, No. 8.